Figure 1:
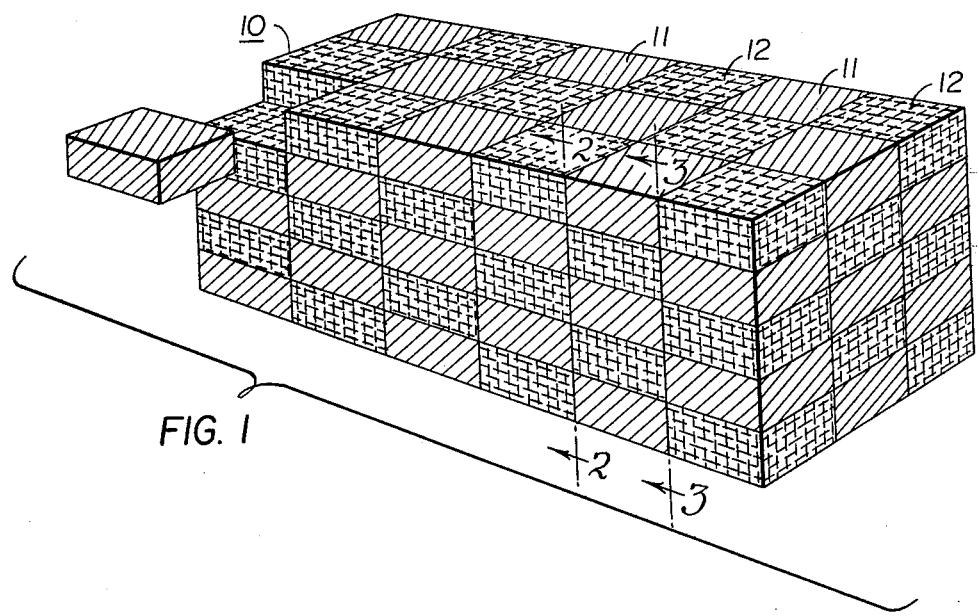

May 26, 1964

K. D. SCHEFFER 3,134,199

COMPLEXED REFRACTORY BRICK

Filed May 19, 1960

INVENTOR.
KARL D. SCHEFFER
BY Watts, Edgerton, Pyle & Fisher
ATTORNEYS

United States Patent Office 3,134,199
Patented May 26, 1964

3,134,199
COMPLEXED REFRACTORY BRICK
Karl D. Scheffer, Clearfield, Pa., assignor to North American Refractories Co., a corporation of Delaware
Filed May 19, 1960, Ser. No. 30,194
4 Claims. (Cl. 50—464)

This invention relates to the refractory-brick art in general, and relates more particularly to a physical form of a refractory and the interrelationship of its ingredients to provide high resistance to destructive elements, sustained under cyclic furnace conditions, high temperature and slag attack.

With common prior art refractory bricks, splitting and cracking due to temperature changes in a furnace have been uncontrolled. Such splitting and cracking removes the support of portions of such bricks and allows those unsupported portions to fall away. The concept of this invention is to eliminate this spalling by deliberately causing a cleavage pattern throughout a refractory body.

It has been discovered that by confining splitting of the brick to such a pattern it is possible to cause the brick to separate into portions which are so shaped and positioned that they do not fall or spall away.

The primary object of this invention is to provide a coherent body of refractory in convenient brick form, which is composed of discrete smaller bodies of materials of dissimilar expansion and other characteristics, which materials are joined together at interfaces defining predetermined planes of cleavage.

It is axiomatic that a basic metallurgical reaction, for example in an open-hearth furnace, is better carried forth in a furnace completely lined with basic brick. However, as is well known and understood in the industry, the materials available for economical construction of furnace linings are not physically suited for building the large roof span necessary in an open-hearth furnace. Hence, until quite recently, the common practice was to compromise by making the areas of the furnace below the metal line of basic brick, and the upper portion of the furnace, including the roof, of the physically stronger acid type of brick, with a neutral chromite brick separating the acid from the basic brick throughout the liquid and slag line area.

More recently, there has been developed a refractory brick having steel spacer plates which in effect provide steel for strength with a refractory filler to resist the heat transfer from the furnace. Although this type of brick construction is in successful operation, the use of multiple metal plates increases the expense of the roof and makes it considerably heavier. Further, the metal causes a loss in some of the refractory properties of the brick.

Mechanically, a ceramic material is distinguishable from a metal by its brittleness, as opposed to high ductility in a metal. This general property of being brittle is responsible for almost all cases of destruction of ceramic bodies. It is particularly true in the case of refractories used in environments of high temperature. High temperature use, particularly in metallurgical furnace applications, is related to large temperature fluctuation and also to sustained temperatures, and these fluctuations and sustained high degrees of temperature have an affect on the mineralogical makeup of the refractory.

Being brittle postulates low elasticity and low tensile strength, and it is because of these low values that ceramic bodies fail in open-hearth metallurgical practice. It is known that even under compression conditions, ceramic bodies fail by a resolved shear and tension, because the compressive strengths of the ceramic bodies are very high compared to their tensile strengths.

When used at high temperatures, the thermal expansion of a body, its regrowth and chemical change become driving forces to its destruction by rupture. The thermal expansion creates a driving force for destruction of the bodies during thermal fluctuations. High temperatures alone bring about mineralogical changes which are normally associated with volume changes in a body. These volume changes take place in a solid or semi-solid state and therefore bring about failure with time, and also are prevalent when cooling the refractory and hence also are evident from a temperature fluctuation standpoint. The failure on cooling takes place because of the new dimension of the changed zone or the new thermal expansion of the newly-formed zones.

Chemical attack erodes and dissolves the refractory. Further, damage caused by fluid constituents penetrating the brick surfaces results in a failure similar to a sustained temperature failure.

All of these types of failure relate themselves to the grain structure of the brick and internal and external stress pattern upon the brick. Refractories in use today utilize materials that are essentially monolithic. This means that the shape is physically homogeneous and on change of temperature contains stress that conforms to the geometry of the shape and the imposed temperature distribution. Because the stress always develops, it can therefore be safely postulated that no refractory shape having an even distribution of stress throughout the body can possibly exist under furnace conditions. The face of the refractory in contact with the hottest part of the furnace is normally unstressed and this is due to the fact that at the temperature of the furnace the refractory is normally mobile enough to readjust itself to the applied force. At some point further back from the refractory face, the temperature is low enough that the refractory becomes rigid. Here the first condition which the brick must resist is that of compression. In the case of basic brick, the compressive layer brings about elevated diffusion and the removal of liquids by the reactivity of the magnesium oxide present. It is in this zone where the mechanical properties are not high enough to stand the pent-up stresses even though the refractory is rigid. The consequence is evident by the hotter zone breaking away from the cooler zone of the refractory in an action which is termed spalling or slabbing.

Another form of destruction is that of the refractory turning into a liquid. The creation of a liquid may develop because of excessive temperature which will melt a refractory or by lower temperature liquids forming through chemical reaction of the furnace constituents with the refractory. Solid or semi-solid destruction then comes about by excessive stress generation within the refractory.

In order to fully understand the invention as herein described, one must be fully aware of what forces destroy refractory brick, and then the steps taken according to this invention to overcome these destroying tendencies will be fully appreciated. Accordingly, it is believed that a listing of the main sources of the stresses causing brick failure will be of value. These forces are:

(A) Thermal expansion coefficient of one material under a temperature gradient.

(B) Differential thermal expansions of constituents of a heated body, and/or under a temperature gradient.

(C) Permanent time-temperature volume changes.

(D) Volume changes due to wetting by liquids.

(E) Expansion due to phase changes.

(F) Volume changes due to differential diffusion in the solid state.

(G) Volume changes due to the formation of new compounds.

These forces are finite and cause failure according to the properties of the refractory at the temperature of the zone in question, and related to the local geometry. They normally do not destroy the first surface due to the high deformability when hot, but will disrupt the first rigid zone further back toward cooler sections of the refractory. It should be noted that all of the effects are magnified under differential temperature conditions such as encountered in the brick where the face is hot and the back of the refractory is cool. The destructive thermal expansion stress is operative during heat-up, and by cyclic fluctuation of the operating temperature, while other factors are mostly time dependent. Depending on the first surface stress conditions, the rate of heating the fundamental geometrical unit, and some less determinable factors, as much as 2 inches of the refractory may be lost by the time the furnace is heated to operating temperature. This is particularly true with basic brick where thermal expansion coefficients are unusually high. Basic bricks again are more susceptible to crystal regrowth than other classes of refractories. Silicate refractories are viscous in nature and a low level of diffusion is encountered. In high magnesia and high lime refractories, diffusion and sintering activities are high and very large destructive volume changes take place. The volume changes arise from the change of the refractory density by the application of a high temperature for a long period of time, by the influx of liquids, and by the removal of liquids due to reaction by magnesia, or special flow directions developing because of the physical nature of the liquids themselves.

Having thus recognized the forces which cause disruption of ceramic bodies, it can then be recognized to be a well known fact that a small piece of ceramic material cannot be spalled as easily as a large piece of material. This general statement is true for a specific range of temperature differences. There is a size which will not spall no matter what the temperature difference. Therefore, with a given set of properties of a material, the control which is possible over spalling by thermal expansion at a specific thermal gradient is that of the size of the body and the imposed temperature differential. One can change the thermal conductivity and the soundness of a body somewhat and thereby affect the spall properties, but under normal conditions with maximum density of the refractory, the only controlling factor that is available is either the change of the chemistry of the body or to change the effective size. As pointed out, one prior device has made use of metal plates to change the effective size of the refractory and to give added strength. According to this invention, the metal plates are made unnecessary by careful choice of geometry and composition of the various parts making up the multiplexed body of refractory. It is entirely impractical to make a basic refractory body of a size usable in furnace building which will not spall under a given set of thermal conditions, because such tiny shapes could not be installed economically.

This invention proposes the use of a coherent body of refractory in convenient brick size which is composed of discrete smaller bodies of the dissimilar materials partially isolated from one another along predetermined planes of cleavage. The discrete areas are integral and are not actually divided, but rather each discrete body of the refractory will develop distinct interfacial surfaces because of its difference from the body with which it is in contact with respect to volumetric and dimension change under firing conditions. When the materials are properly selected, the differences are not sufficiently great to produce a shattering, but rather the bodies will remain bonded. This bond is not equivalent, however, to the internal strength of the bodies, and hence the unit is at once a united structure, but having distinct cleavage interfaces. Under these conditions, each finite body of refractory will act as if it were isolated from the other bodies. In this manner the extension is within the limits of the elasticity of the refractory and no disruption of the bond will be encountered. The refractory bodies will therefore stay together. The degree of discontinuity may be controlled by selection of materials with much leeway in the allowable differences of properties. A maximum change of property would bring about a maximum resistance to spalling, but it may also bring about a disruption of the inter-body contact, and hence too great a degree of difference is to be avoided. Further, this invention must be differentiated from prior attempts to create a non-spalling brick wherein a mere mixture of chromite grain and magnesium oxide clinker has been attempted. Such mixture produces a random pattern of particle relationship which is not under the control of the designer, therefore, it should now be noted that destruction of basic brick is not from spalling alone. Spalling is one of the contributing factors. It is only a small factor in the case where long periods of temperature exposure exist, although spalling is the biggest factor where thermal cycling is experienced.

Figure 2:
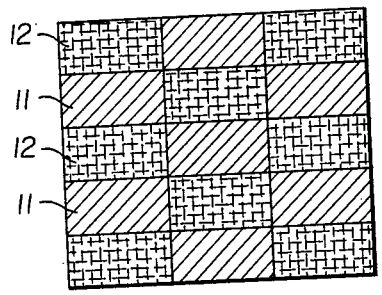
Figure 4:
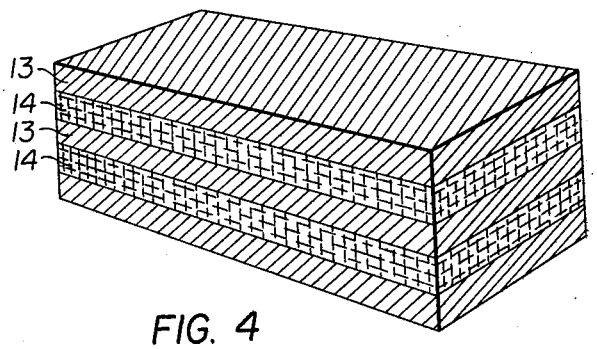
Figure 3:
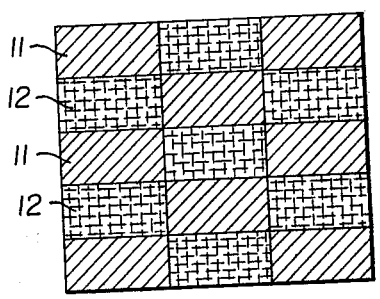

In the development of the preferred embodiment of this invention, now to be set forth specifically, many useful means of producing a complexed structure were employed with various degrees of success. The preferred forms will be referred to hereinafter as a checkerboard brick and a laminated brick. Bearing in mind the foregoing discussion of the general problems involved and objects being sought, further objects and a better understanding of the present invention may be had by reference to the following description of the specific preferred embodiments of the invention illustrated in the drawing of the preferred embodiments, in which:

FIGURE 1 is a perspective view of a brick-sized unit made according to the principles of this invention;

FIGURES 2 and 3 are sectional views taken along section lines 2—2 and 3—3, respectively, of FIGURE 1; and FIGURE 4 is a perspective view of another, alternate, preferred embodiment of this invention.

The color contrast in the drawings is a reproduction of the factual condition of the preferred embodiment, but the shading is employed in the drawing to make clear the fact of the use of bonded discrete bodies, each differing from its neighbor, and is not to be interpreted as a requirement that all embodiments must have color contrast.

The checkerboard brick consists very simply of a convenient brick-sized unit or module 10 having a unitary body composed of a three-dimensional checkerboard arrangement of alternate small bodies of two different types of refractory material. As illustrated in FIGURE 1, the checkerboard arrangement or tessellated texture formed by the alternate bodies of refractory material is such that the bodies are geometrically arranged in a plurality of columns and rows. The model employed for making the FIGURE 1 consisted of dark areas 11 of high chromite refractory, and lighter colored areas 12 of magnesia refractory. Note that the discrete bodies are not overlapped as in a brick wall, although such overlapping is not ruled out as an unacceptable structure. Nevertheless, by the non-overlapping arrangement illustrated in FIGURE 1 in which bodies of the same refractory material are out of substantial contact, and by the use of the distinctly different types of materials, after the composite body has been subjected to firing the difference in thermal expansion properties of the two materials causes the cleavage planes to devolop between the dissimilar materials with a residual adherent bond of ample strength to permit the unit 10 to be an integral, mechanically stable brick unit, just as any conventional brick. However, it will be obvious that exceedingly small areas 11 and 12 would require considerably greater manufacturing effort than larger areas. Hence, a practical structure will be readily devised for service conditions to be met. The illustrated embodiment of FIGURE 1 is composed of individual areas of about 1 inch or slightly less in length and width, by about ½ inch in thickness. This indication of the illustrated size is not to be construed as a limitation on either the magnitude or the smallness of size, but is a description only of the illustrated embodiment.

In the FIGURE 2, an alternate construction of useful properties was produced by creating individual layers of materials 13 and 14.

The particular illustrated bricks were composed of a batch containing 80 percent of chromite and 20 percent of a periclase clinker. The chromite formed the coarse fraction of the refractories while the periclase formed the fine fraction. A second batch consisted of all periclase proportioned in the regular fashion which gives maximum density. A compartmented insert was made for a brick-sized die and the mask was employed which allowed alternate boxes to remain open in the compartmented section. The first mix was poured in with half of the holes open. The mask was then moved and the balance of the holes filled with the periclase mixture. The gridwork was then moved to the next position and the process repeated taking care to change the position of the chromite mixture with relation to the all periclase mixture in the bottom layer in which bodies of the same refractory material are out of substantial contact. When sufficient material had been placed in the box, the mask and the compartmented gridwork were removed and the brick was compressed in the usual fashion to provide a unitary brick module. If the mask is not shifted fully, a Z-shaped unit of like material in the superposed planes will result, which may be actually advantageous in some situations. The brick emerged solid and well bonded. The same mix was employed to make the laminate brick of FIGURE 2. The chromite mixture was poured into the die with the bottom plate partly down and in such a position to give a layer of roughly ¾ of an inch. The material was placed in the box and this shallow box stroked off. The bottom plate was then moved down ¾ of an inch and the periclase mixture was placed on top of it and again stroked off. This process was continued until the full brick-sized box was created. Again, the brick was pressed. Again, it must be cautioned that these are examples only of particular refractory mixes which are useful for some but not all furnace conditions. Those skilled in the art will be readily able to change the refractory mixes according to intended end use.

Further, although the pressed bricks may be fired prior to installation in a furnace, it is practical to employ some bonding agent in the mixtures and, when bonding agents are used, the pressed brick will be found to have a very high cohesion strength and may be installed in a furnace unfired. The heat of the furnace when first brought up to service conditions will fire the brick and cause the desired controlled development of planes of cleavage.

It has been found that the establishment of a regular geometric system of cleavage planes produced a further desirable result which was not evident from a preliminary examination of the brick under laboratory conditions. As previously mentioned, liquid movement into the brick from the hot face is responsible for volumetric changes leading to destruction of the brick. In monolithic structures, the liquids move in a plane front into the brick. That is, a solid front of liquid goes into the brick. The mosiac structure or tessellated texture according to this invention causes this front to be broken up by the differential absorption characteristics of the refractory body. Thus, the straight line or solid front is destroyed and eliminates the opportunity for a stress development along the plane at the front. It has been found that stresses along the front plane are often more destructive than chemical attack.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A mechanically stable, unitary refractory brick module having a predetermined internal stress pattern and a uniform tessellated texture throughout its length, width and depth, said tessellated texture being characterized by integral but distinct alternating bodies of refractory material having different physical and chemical characteristics, said module comprising a plurality of layers of said bodies in contacting relation, each layer comprising a plurality of said alternating bodies with the sides of those bodies having common physical and chemical characteristics contacting only the sides of those bodies of different physical and chemical characteristics, the bodies of said common physical and chemical characteristics in a layer also contacting those bodies of said different physical and chemical characteristics in a contacting layer, whereby said bodies of said common physical and chemical characteristics alternate with said bodies of said different physical and chemical characteristics throughout the length, width, and depth of said module.

2. A mechanically stable, unitary refractory brick module characterized by a uniform tessellated texture throughout its length, width and depth, said tessellated texture being formed by integral but distinct alternating bodies of two different refractory materials, said module comprising a plurality of layers of said bodies in contacting relation, each layer comprising a plurality of said alternating bodies with the sides of those bodies of one refractory material contacting only the sides of those bodies of the other refractory material, the bodies of said one refractory material in a layer also contacting only those bodies of said other refractory material in a contacting layer, whereby said bodies of said one refractory material alternate with said bodies of the other refractory material throughout the length, width, and depth of said module.

3. The brick module as claimed in claim 2 wherein one refractory material consists essentially of chromite and the other refractory material consists essentially of periclase.

4. The brick module as claimed in claim 3 wherein said bodies are of corresponding size and have cross-sectional dimensions in the range of from approximately one-half inch to approximately one inch.

References Cited in the file of this patent

UNITED STATES PATENTS

| | | |
|---|---|---|
| 384,961 | Claflin | June 26, 1888 |
| 1,448,684 | Beecher et al. | Mar. 13, 1923 |
| 1,666,284 | Gilchrist | Apr. 17, 1928 |
| 1,765,255 | Banta | June 17, 1930 |
| 1,775,396 | Jackman et al. | Sept. 9, 1930 |
| 1,828,078 | Sealey | Oct. 20, 1931 |
| 1,889,745 | Chapman | Dec. 6, 1932 |

(Other references on following page)

UNITED STATES PATENTS

| | | |
|---|---|---|
| 2,184,601 | Konopicky | Dec. 26, 1939 |
| 2,465,170 | Rochow | Mar. 22, 1949 |
| 2,532,190 | Pirani et al. | Nov. 28, 1950 |
| 2,606,017 | Longenecker | Aug. 5, 1952 |
| 2,799,233 | Hauer | July 16, 1957 |
| 2,861,793 | Roudabush | Nov. 25, 1958 |
| 2,901,990 | Hutter | Sept. 1, 1959 |
| 2,908,157 | Bliss et al. | Oct. 13, 1959 |
| 2,949,643 | Hosbein | Aug. 23, 1960 |
| 2,949,704 | Jacobs | Aug. 23, 1960 |

FOREIGN PATENTS

| | | |
|---|---|---|
| 614,059 | Great Britain | Dec. 8, 1948 |
| 638,767 | Great Britain | June 14, 1950 |
| 690,356 | Great Britain | Apr. 25, 1953 |
| 1,070,210 | France | Feb. 17, 1954 |
| 1,037,638 | Germany | Aug. 28, 1958 |

OTHER REFERENCES

German application 1,041,633, printed Oct. 23, 1958.

Open Hearth Proceedings, A.I.M.E., 1951, p. 144, Fig. 7.

UNITED STATES PATENT OFFICE
CERTIFICATE OF CORRECTION

May 26, 1964

Patent No. 3,134,199

Karl D. Scheffer

It is hereby certified that error appears in the above numbered patent requiring correction and that the said Letters Patent should read as corrected below.

Column 5, lines 37 and 38, for "in which bodies of the same refractory material are out of substantial contact" read -- so as to create rows and columns formed by alternating zones of the two refractory mixtures --.

Signed and sealed this 6th day of October 1964.

(SEAL)
Attest:

ERNEST W. SWIDER
Attesting Officer

EDWARD J. BRENNER
Commissioner of Patents